(No Model.)

T. B. JEFFERY.
VEHICLE WHEEL.

No. 383,130.    Patented May 22, 1888.

Witnesses:
Cora L. Cadwallader,
Fred Gerlach.

Inventor:
Thomas B. Jeffery
By Burton & Burton
His Attorneys

UNITED STATES PATENT OFFICE.

THOMAS B. JEFFERY, OF RAVENSWOOD, ILLINOIS.

VEHICLE-WHEEL.

SPECIFICATION forming part of Letters Patent No. 383,130, dated May 22, 1888.

Application filed August 5, 1887. Serial No. 246,231. (No model.)

*To all whom it may concern:*

Be it known that I, THOMAS B. JEFFERY, a citizen of the United States, residing at Ravenswood, county of Cook, and State of Illinois, have invented certain new and useful Improvements in Vehicle-Wheels, which are fully described in the following specification, reference being had to the accompanying drawings, forming a part thereof.

Figure 1:
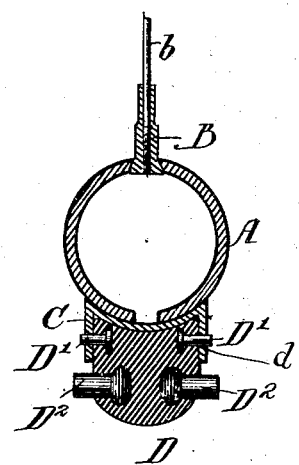
Figure 2:
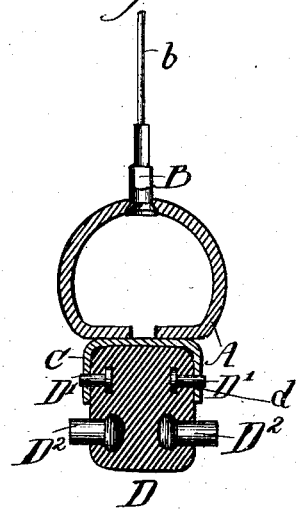
Figure 3:
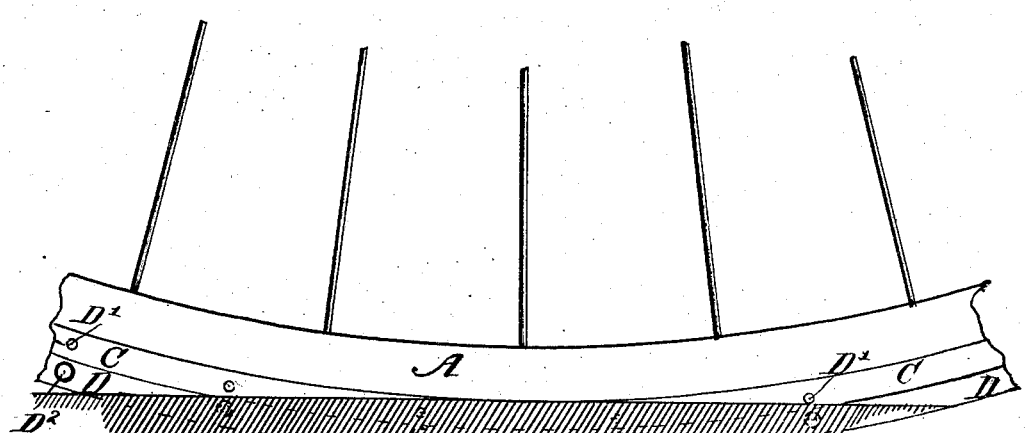

In the drawings, Figure 1 is a vertical section of the felly and tire of a vehicle-wheel, showing my improvement. Fig. 2 is a modification of same. Fig. 3 is a side elevation of a vehicle-wheel in a rut, illustrating the application of my device and showing the earth in section.

A is the rim; B, the spoke nut or nipple securing the spoke $b$.

C is a band brazed or secured in any manner to the outer circumference of the rim, flanged to receive the tire D, and having holes $d$ at short intervals in both flanges.

D' are pins, whose heads $d'$ are embedded in the tire and whose smaller ends project through the holes $d$ in the flanges of the band C, thus securing the tire. $D^2$ are similar but larger pins, whose heads are similarly embedded in the tire and whose purpose will be hereinafter explained.

My invention relates to the felly and tire of a vehicle-wheel. It is designed to be used particularly in velocipede-wheels, and is so shown and described herein. One of its objects is to provide a method of attaching spokes to the rim without the necessity of any hole in the rim except the one through which the spoke or nipple is attached, and so to avoid the weakening of the rim caused by an extra hole.

It has been customary and necessary in attaching spokes to the ordinary hollow rim to perforate the outer as well as the inner wall, in order to pass the spoke or nipple through the rim and allow the expanded head of the nipple or a nut and washer, or similar device for securing the spoke, to bear against the outer side of the inner wall of the rim. In my device I form the rim of one piece bent into a cylindrical or other desired form, so that its edges approach but do not meet, thus leaving a rift, E, in its outer circumference. The spokes or nipples are then passed through this rift into holes bored in the inner wall and made fast in the usual manner. The band C, flanged to receive the tire, is then brazed or welded to the rim, as shown in Figs. 1 and 2, so as to cover the rift and overlap the adjacent edges of the rim, thus making a solid rim flanged on its outer circumference to receive the tire. As far as securing the tire is concerned, it is of course immaterial whether the flanged band C is a separate piece or a continuation of the rim A.

Another object of my invention is to avoid a difficulty which has been encountered when the rubber tire is attached to the rim by cement alone, which is the usual method employed. This usual mode is difficult and not altogether reliable, and affords no means of removing the tire without heating the rim, which requires special facilities. To avoid these objections and defects, I form the tire with the pins D embedded in its substance, as described, before vulcanizing, and retained securely by their enlarged heads, as shown, and having their ends slightly projecting laterally, part on one side and part on the other, at positions corresponding to the holes $d$. They may be of hard rubber, metal, or other suitably hard substance. The tire is inserted in the rim, being laterally compressed to admit the projecting pins between the flanges, care being taken that the position of the pins agrees with that of the holes, so that the reaction of the rubber tire from such compression will throw the projecting ends of the pins into the holes. The pins should be allowed to project far enough through the flanges so that there will be no danger of their being pulled from their holes by the lateral yielding or compression of the rubber tire when in use, and it will then be seen that the enlarged ends of the pins being embedded firmly in the rubber, the rubber itself must be torn before the tire can be forced from the rim by any twisting or turning upon the ground.

A third object of my device is to facilitate the turning of a bicycle-wheel out of a rut or track quickly and safely. The exposed surface of the ordinary tire is round and smooth, and it has been found that when the wheel, being in a rut, is turned toward either side the tire will slip along the side of the rut, and before it can be forced out of it the wheel will probably be overbalanced and the rider unseated. This is especially true when attempting to turn out of a car-track, when the flange of the rail over which the wheel must be turned presents a smooth perpendicular side to the tire, in which case it is next to impossible, even for a skillful rider, to avoid either a dismount or a fall. I therefore provide pins D², similar to the pins D', and secured to the tire in precisely the same manner and similarly situated, but nearer its outer edge, and which project a short distance on either side of the tire. These pins being a short distance apart circumferentially on the tire, when the wheel is turned on a car-rail, for instance, one of them will at once catch upon the top of the rail-flange, and, acting as a climber, will raise the wheel immediately from the rail and allow it to be turned at once out of the track. If the wheel is sought to be turned out of a rut, these projecting pins will operate in the same manner by gripping the earth forming the side of the rut and compel the wheel to "climb" out.

The pins D² are preferably placed in the same radial planes with the pins D', so that when any strain is brought upon them there will be the pins D' back of them to aid in bearing it; but this is not material. The pins D' or D² may also be formed of the same rubber as the other parts of the tire, and consist of simple projections standing out from the tire, which modification will necessitate larger apertures in the rim, if used there. The projections D² may also nearly correspond in distance from one another to the spaces between the holes in the rim, so that the outer surface may be turned inward when worn, thereby extending the length of time the tire may be used.

I claim—

1. In a vehicle-wheel, a felly comprising a rim formed of one piece bent so that its edges approach, and a band secured upon its outer circumference overlapping said edges, substantially as and for the purpose set forth.

2. In a vehicle-wheel, a felly comprising a hollow rim formed of one piece bent so that its edges approach but do not meet, and a band secured upon its outer circumference overlapping said edges and flanged to receive the tire, substantially as and for the purpose set forth.

3. In a vehicle-wheel, in combination with the rim flanged to receive the tire, a rubber tire having on each side a row of pins embedded firmly therein projecting through corresponding holes in the flanges, whereby the tire is secured to the rim, substantially as and for the purpose set forth.

4. In a vehicle-wheel, in combination with the rim flanged to receive the tire, a rubber tire having on each side a row of pins, whose enlarged heads are embedded firmly therein, and which project through corresponding holes in the flanges, whereby the tire is secured to the rim, substantially as and for the purpose set forth.

5. In a vehicle-wheel, in combination with the rim flanged to receive the tire, a soft-rubber tire having on each side a row of pins of harder material embedded firmly therein and projecting through corresponding holes in the flanges, whereby the tire is secured to the rim, substantially as and for the purpose set forth.

6. In a vehicle-wheel, in combination, the rim, a band secured upon its outer circumference and flanged to receive the tire, and a rubber tire having on each side a row of pins, whose enlarged heads are firmly embedded therein and whose smaller ends project through corresponding holes in the flanges, whereby the tire is secured to the rim, substantially as and for the purpose set forth.

7. In a vehicle-wheel, in combination with the rim, the rubber tire secured thereabout, having on each side beyond the rim a row of projections thereon and extending laterally, substantially as and for the purpose set forth.

8. In a vehicle-wheel, in combination with the rim, the rubber tire secured thereabout, having on each side beyond the rim a row of pins, whose enlarged heads are firmly embedded therein and whose smaller ends project laterally, substantially as and for the purpose set forth.

9. In a vehicle-wheel, in combination with the rim, a soft-rubber tire secured thereabout, having on each side beyond the rim a row of pins of harder substance firmly embedded therein and projecting laterally, substantially as and for the purpose set forth.

10. In a vehicle-wheel, in combination with the rim flanged to receive the tire, the rubber tire secured thereabout and having on each side two rows of pins lying in the same radial planes, embedded firmly in the tire and projecting laterally, substantially as and for the purpose set forth.

In testimony whereof I have hereunto set my hand, at Chicago, Illinois, this 1st day of August, 1887, in the presence of two witnesses.

THOS. B. JEFFERY.

Witnesses:
E. F. BENTON,
CORA L. CADWALLADER.